United States Patent [19]

Billet et al.

[11] Patent Number: 4,667,470
[45] Date of Patent: May 26, 1987

[54] TRANSMISSION SYSTEM, IN PARTICULAR FOR AUTOMOBILE VEHICLES, HYDRAULIC COUPLING UNIT COMPRISING SAME, AND MOVEMENT TAKE-UP DEVICE ADAPTED FOR USE IN SAME

[75] Inventors: René Billet, Lamorlaye; Jean Bionaz, Fontenay-sous-Bois, both of France

[73] Assignee: Valeo, Paris, France

[21] Appl. No.: 795,790

[22] Filed: Nov. 7, 1985

[30] Foreign Application Priority Data

Nov. 9, 1984 [FR] France .................. 84 17125

[51] Int. Cl.$^4$ ............................................ F16D 33/00
[52] U.S. Cl. .................... 60/338; 192/70.17; 464/68
[58] Field of Search ............. 60/338, 344, 345, 346; 464/67, 68; 192/106.1, 70.17, 70.18

[56] References Cited

U.S. PATENT DOCUMENTS 4,462,490 7/1984 Hattori ............... 192/0.076
4,484,898 11/1984 Kohno ..................... 464/64
4,588,058 5/1986 Aliovate ............ 192/70.17 X

FOREIGN PATENT DOCUMENTS 507602 9/1920 France .
2518202 6/1983 France .

Primary Examiner—Stephen F. Husar
Attorney, Agent, or Firm—Charles E. Brown; Charles A. Brown

[57] ABSTRACT

A transmission system comprises an annular input member adapted to be keyed at least circumferentially to a first shaft. This input member has a generally cylindrical axial wall and a generally transverse radial wall. A movement take-up device within the cylindrical wall has an input part by which it is keyed axially and circumferentially to the input member and adapted to be at least circumferentially keyed to a second shaft. The input part bears axially on the transverse wall. At least one dog is attached to the cylindrical wall and has at least one of its two lateral edges generally transversely disposed relative to the axis of the system and converging towards its other lateral edge in the direction towards the transverse wall. A notch in part of the input part is complementary to and interlocked with the aforementioned dog.

26 Claims, 7 Drawing Figures

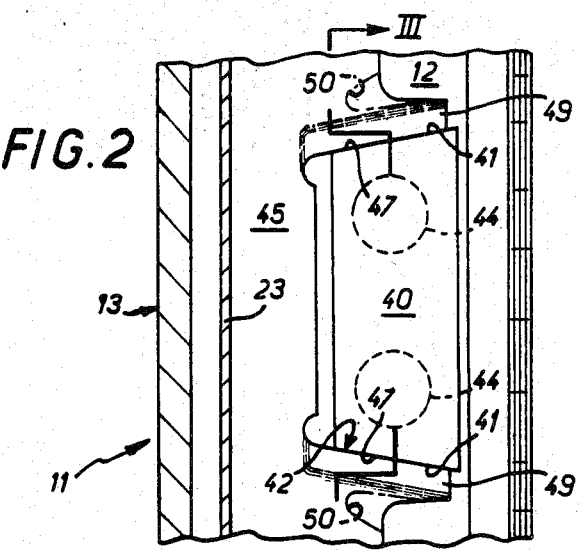
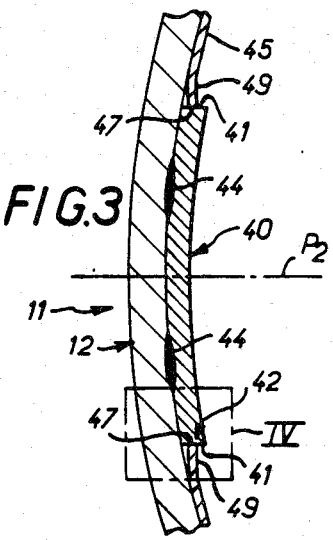
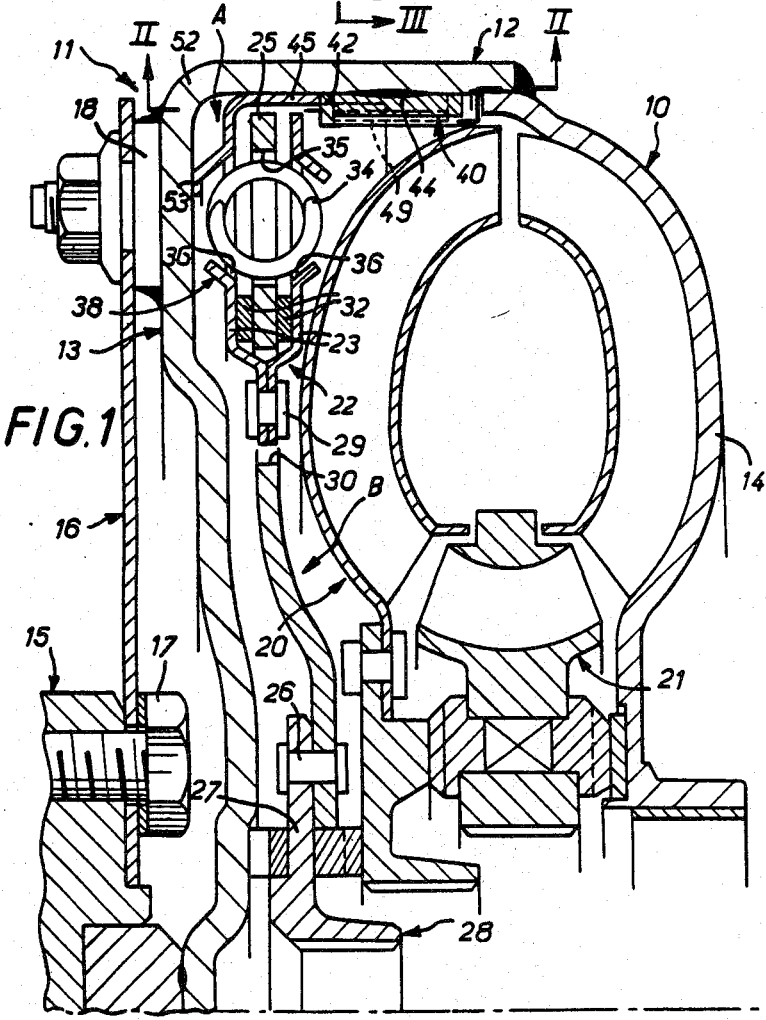
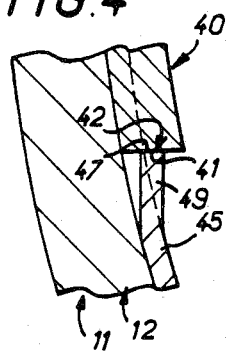

TRANSMISSION SYSTEM, IN PARTICULAR FOR AUTOMOBILE VEHICLES, HYDRAULIC COUPLING UNIT COMPRISING SAME, AND MOVEMENT TAKE-UP DEVICE ADAPTED FOR USE IN SAME

BACKGROUND OF THE INVENTION

1. Field of the Invention

The present invention generally concerns transmission systems designed to contribute to the rotational coupling of one shaft to another.

2. Description of the Prior Art

It is more particularly directed to transmission systems such as these which comprise, on the one hand, an annular member, hereinafter referred to for convenience as the input member, which is adapted to be keyed at least circumferentially to a first of the shafts concerned, in practice a driving shaft, and which features a generally cylindrical axial wall and a generally transverse radial wall, and, on the other hand, within the internal volume of said cylindrical wall, a movement take-up device keyed axially and circumferentially to the input member and at least circumferentially to the second of the shafts concerned, in practice a driven shaft.

A transmission system of this kind may, for example, form part of a hydraulic coupling unit, in particular for automobile vehicles, in the form of a torque converter or a hydraulic coupling.

A hydraulic coupling unit of this kind generally comprises an impeller wheel and a cover which, itself comprising a generally cylindrical wall and a generally transverse wall, is fastened to the impeller wheel and forms with the outside wall of the latter a casing in which are disposed in particular, facing the impeller wheel, a turbine wheel and, within the internal volume of its cylindrical wall, between its transverse wall and said turbine wheel, a movement take-up device.

In the case where it is required to filter out at this point vibrations which may arise in the kinematic system into which the assembly is inserted, this movement take-up device is a torsional damper device which itself comprises two coaxial parts disposed to rotate relative to one another against elastic means disposed circumferentially between them and a first of which parts, hereinafter referred to for convenience as the input part, is keyed to the input member whereas the second of said parts, hereinafter referred to for convenience as the output part, is adapted to be keyed to the driven shaft concerned.

One of the problems to be overcome in implementing hydraulic coupling units of this type is to achieve under good conditions the axial and circumferential keying of the input part of the torsional damper device to the input member which the cover of the assembly constitutes.

In this instance, the problem results in particular from the fact that the component parts to be employed to achieve this are operative in an extremely congested environment, the amount of space available axially and radially being particularly limited.

Thought might be given, for example, to fastening to the transverse wall of the cover, as by welding or riveting, one of the component parts of the input part of the torsional damper device.

When riveting is employed, the necessary rivet may be drawn from the wall itself of the cover, to preserve the fluid-tightness of the assembly, although this is at the price of a certain degree of complexity.

When welding is used, an additional difficulty has to be overcome and is due to the fact that, although the wall of the cover concerned is of mild steel, for example, which can usually be welded, the same does not apply to the component parts of the input part of the torsional damper device, as these are usually of treated steel.

Moreover, in both cases the transverse wall in question of the cover consists of a portion of the cover which, in operation, is subjected to the highest mechanical stresses and which is therefore likely to be subjected to non-negligible deformation prejudicing the strength of the riveting and/or welding that may have been applied to it.

Given what has been said, it has also been proposed to link the input part of the torsional damper device to the cylindrical wall of the cover, where the stresses are lower, and to use lugs for this purpose.

Thought might be given to making these lugs of mild steel, for example, which can be welded and to attaching them by riveting to one of the component parts of the input part of the torsional damper device, while fixing them by welding to the cylindrical wall of the cover.

However, apart from the fact that by their very nature these lugs require a non-negligible area for mounting them, which may prove unacceptable in certain applications, in particular those in which use is made, for the elastic means disposed circumferentially between the two parts of the torsional damper device, of coil springs which must be of significant circumferential extent to procure an equally extensive range of movement between said parts, the use of rivets for fixing them to that of these parts which constitutes the input part itself requires a non-negligible area, to the detriment of the overall diameter of the assembly.

Also, in implementing hydraulic coupling units with integrated movement take-up devices of the type concerned, a further difficulty results from the fact that, independently of the previous problem of fixing the input part of the movement take-up device to the cover, it is desirable that the placing of the latter in said cover is effected by simple axial insertion into the cover, and that this be done autonomously, by means of a subassembly made up beforehand.

A general object of the present invention is an arrangement which, while enabling this requirement to be satisfied, also provides a satisfactory and simple means of overcoming the problems outlined hereinabove.

SUMMARY OF THE INVENTION

In a first aspect, the present invention consists in a transmission system comprising an annular input member adapted to be keyed at least circumferentially to a first shaft and having a generally cylindrical axial wall and a generally transverse radial wall, a movement take-up device within said cylindrical wall having an input part by which it is keyed axially and circumferentially to said input member and adapted to be at least circumferentially keyed to a second shaft, said input part bearing axially on said transverse wall, at least one dog attached to said cylindrical wall and having at least one of its two lateral edges generally transversely disposed relative to the axis of the system and converging towards its other lateral edge in the direction towards said transverse wall, and a notch in part of said input part complementary to said dog and interlocked with said dog.

In another aspect, the present invention consists in a hydraulic coupling unit comprising a transmission system as defined in the previous paragraph.

In a further aspect, the present invention consists in a movement take-up device, in the form of a torsional damper device, for example, adapted to form part of a transmission system as defined in the aforementioned paragraph.

The term "dog" as used here means, in the usual way, an accessory of the type used on a lathe to drive the workpiece to be turned from the corresponding rotating plate.

In the transmission system in accordance with the invention, it consists in practice of a simple plate the contour of which is generally trapezoidal.

In practice a plurality of dogs of this type, circumferentially distributed, are preferably employed.

Be this as it may, as it is a matter of implementing a hydraulic coupling unit with integrated movement take-up device, in particular for automobile vehicles, it is sufficient in accordance with the invention, after inserting the movement take-up device into the cover, whether it is a torsional damper device or not, to engage axially at the periphery of said cover the dog or dogs to be used and, these dogs acting like wedges with regard to the input part of said movement take-up device, to then fix them by welding to the cylindrical wall of said cover, at the end of their insertion into the corresponding notches in said input part.

Having no mechanical coupling other than an interference fit with the relevant portion of the input part of the movement take-up device, the dogs may readily be made in mild steel, for example, fully compatible with the welding to be done to fix them to the cylindrical wall of the cover.

Further, they advantageously of themselves have an extremely limited overall diameter and fitting them therefore does not normally give rise to any problems, even in a congested environment.

This is all the more true in that, given the axial way in which the dogs are operative, the portion of the input part with which each of them cooperates may advantageously itself be formed by a simple axial extension, also of extremely limited overall diameter, of one of the component parts of said input part.

The characteristics and advantages of the invention will emerge from the following description given by way of example with reference to the appended drawings.

BRIEF DESCRIPTION OF THE DRAWINGS

FIG. 1 is a half-view in axial cross-section of a transmission system in accordance with the invention and of the hydraulic coupling unit of which it forms part.

FIG. 2 is a partial view in elevation and cross-section of this transmission system, as seen from the inside in the direction of the arrow II in FIG. 1, developed in the flat.

FIG. 3 is a partial view of it in transverse cross-section on the broken line III—III in FIG. 2.

FIG. 4 shows to a larger scale the detail of FIG. 3 marked by the box IV on the latter.

DESCRIPTION OF THE PREFERRED EMBODIMENTS

Figure 5:
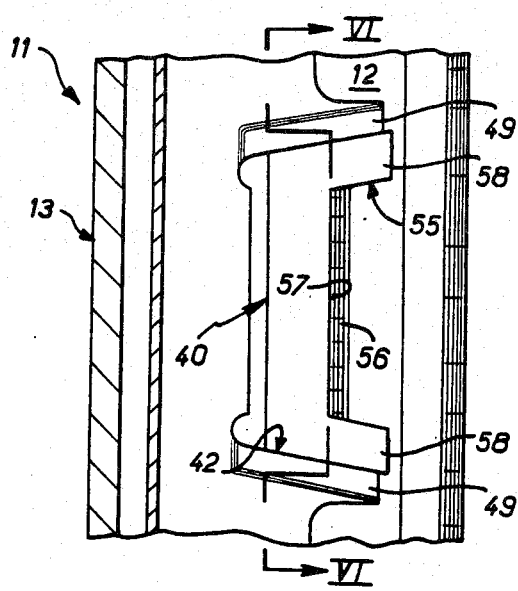
FIGS. 5 and 6 are views respectively analogous to those of FIGS. 2 and 3 and concern an alternative embodiment.

The figures show by way of example the application of the invention to a hydraulic coupling unit with integrated movement take-up device.

As a hydraulic coupling unit of this kind does not of itself constitute part of the present invention, it will not be described in complete detail here.

In this instance, it consists of a torque converter.

A hydraulic coupling unit of this kind comprises, overall, an impeller wheel 10 and a cover 11 which, comprising a generally cylindrical wall 12 and a generally transverse wall 13, is fastened to the impeller wheel 10, more precisely to the outside wall 14 of the latter, being for example welded to said outside wall 14 by the edge of its cylindrical wall 12.

The term "generally transverse wall" here signifies, in the usual manner, a wall which, taken overall, extends substantially perpendicularly to the axis X of the assembly, it being nevertheless understood that, as shown, it may have a more or less convoluted configuration.

Be this as it may, the annular part which in this way constitutes the cover 11 forms an input member of the assembly, this annular member being adapted to be keyed at least circumferentially to a first shaft.

In practice this is a driving shaft, more precisely the crankshaft 15 of the motor of the vehicle concerned.

An elastically deformable flange 16 couples this crankshaft 15 to the transverse wall 13 of the cover 11, being fixed to said crankshaft 15 by screws 17 and to said transverse wall 13 by bolts 18 welded to the latter.

The cover 11 forms with the outside wall 14 of the impeller wheel 10 a casing in which are disposed, in particular, on the one hand, facing the impeller wheel 10, a turbine wheel 20 with, in this specific instance, a reactor wheel 21 between this impeller wheel 10 and this turbine wheel 20, at the root of the latter, and, on the other hand, within the internal volume of the cylindrical wall 12 of the cover 11, between the transverse wall 13 of the latter and the turbine wheel 20, a movement take-up device 22.

In the embodiment shown this is a torsional damper device, for example.

As this torsional damper device 22 does not of itself form part of the present invention, it will not be described in complete detail here.

It will suffice to indicate that, in the manner known per se, it generally comprises two coaxial parts A and B which are disposed to rotate relative to one another against elastic means disposed circumferentially between them and a first of which, the part A, hereinafter referred to four convenience as the input part, is keyed axially and circumferentially to the input member constituted by the cover 11, whereas the second, the part B, hereinafter referred to for convenience as the output part, is adapted to be keyed at least circumferentially to a second shaft.

In practice this is a driven shaft, the input shaft of a gearbox (not shown), for example.

In the embodiments shown, the input part A comprises two annular transverse flanges 23 forming guide rings for the associated elastic means disposed one on each side of an annular flange 25 forming a hub flange which is part of the output part B and is fastened at its inside periphery, as by rivets 26, for example, to the flange 27 of a hub 28 adapted to be constrained to rotate with the driven shaft concerned.

The annular flanges 23 are constrained to rotate together, being to this end linked together by rivets 29 which pass through openings 30 provided for this purpose in the annular flange 25 that lies between them.

Each is separated from this flange by a respective friction ring 32.

In the embodiments shown, the elastic means disposed circumferentially between the parts A and B thus constituted themselves consist of coil springs 34 which are circumferentially distributed and each of which is individually disposed and accommodated partly in openings 35 provided for this purpose in the annular flange 25 that the output part B comprises and partly in openings 36 also provided for this purpose, and in corresponding relationship with the openings 35, in the annular flanges 23 of the input part A.

In the embodiments shown, the annular flanges 23 feature an outwardly projecting louver 38 along at least one of the circumferential edges of the openings 36 and in practice along each of the latter, for guiding, that is to say retaining, the springs 34 constituting the associated elastic means.

In accordance with the invention, and in combination, to key it axially and circumferentially to the input part constituted by the cover 11, on the one hand, the input part A of the torsional damper device 22 bears axially towards the transverse wall 13 of the cover 11 and, on the other hand, there is attached to the cylindrical wall 12 of said cover 11 at least one dog 40 at least one of the lateral edges 41 of which is generally oblique relative to the axis X of the assembly, converging towards the other in the direction towards said transverse wall 13, and which is interlocked with a complementary notch 42 provided for this purpose on a member forming part of said input part A.

In practice, in the embodiment shown, the part A of the torsional damper device 22 bears directly in the axial direction against the transverse wall 13 of the cover 11, but it goes without saying that such bearing engagement could also be implemented indirectly.

This is the sense intended when it is here specified that this axial bearing relationship is towards the transverse wall of the cover 11.

In practice, in the embodiment shown, the dog 40 is formed by a plate of generally trapezoidal contour, both its lateral edges being oblique to the axis X of the assembly.

The plate which constitutes it is generally curved to match the contour of the cylindrical wall 12 with which it is in contact.

Preferably, and as is more clearly seen in FIGS. 3 and 4, the flanks of the dog 40 thus constituted forming the lateral edges 41 of the latter both extend perpendicularly to the diametral plane P1 of the assembly which is itself perpendicular to the diametral plane P2 of said assembly passing through the median area of said dog 40.

The diametral plane P1 is schematically represented in chain-dotted line in FIG. 1, being coincident with the axis X of the assembly, whereas the diametral plane P2, which is that of FIG. 1, is schematically represented in chain-dotted line in FIG. 3.

In the embodiment specifically shown in FIGS. 1 through 4, the edges of the contour of the dog 40 are all rectilinear and this dog 40 is spot welded to the cylindrical walls 12 of the cover 11.

As schematically represented, two spot welds 44 may be sufficient to this end, for example.

A plurality of dogs 40 circumferentially distributed are preferably employed, of course.

In the embodiments shown, the various dogs 40 thus employed are independent of one another, each forming a distinct member.

Also, in the embodiments shown, the notch 42 in the input part A of the torsional damper device 22 with which a dog 40 of this kind is interlocked forms part of an axial extension 45 of that of the annular flanges 23 of this input part A which is axially nearer the transverse wall 13 of the cover 11, and this axial extension 45 originates from the outside periphery of this annular flange 23, extending in the direction opposite to said transverse wall 13 of the cover 11, beyond the outside periphery of the annular flange 25 of the output part B of said torsional damper device 22 and the other flange 23 of said input part A of the latter.

An axial extension 45 may be provided in this way, in the form of a lug, for each of the dogs 40 employed.

However, as shown here, the axial extension 45 preferably forms a circumferentially continuous ferrule in contact with a cylindrical wall 12 of the cover 11.

Be this as it may, in the embodiment shown the axial extension 45 which one of the annular flanges 23 of the torsional damper device 22 features is advantageously in contact with the cylindrical wall 12 of the cover 11 and thus serves advantageously to center said torsional damper device 12 within said cover 11.

Be this as it may, as shown here, the lateral edges 47 of a notch 42 with which is interlocked a dog 40 are preferably at least in part portions of axial lugs 49 which, projecting axially from the corresponding edge of the axial extension 45, are elastically deformable in the circumferential direction by virtue of their relatively limited width.

There advantageously results within the torsional damper device 22, which is inevitably subjected to vibration in use, a capacity for elastic deformation at the point of contact with the dogs 40 which are rigidly fixed to the cover 11.

As schematically represented in chain-dotted line in FIG. 2, this capacity for elastic deformation may be more or less accentuated by conferring a greater or lesser axial extent on the lugs 49 by means of notches 50 that extend more or less deeply into the axial extension 45 of the annular flange 23 concerned.

Be this as it may, as is more clearly visible in FIG. 4, the edges 47 of the notch 42 with which is interlocked each of the dogs 40 employed are preferably radially offset on the cylindrical wall 12 of the cover 11, so as to contact the flanks of a dog 40 of this kind in the median area thereof.

An arrangement of this kind, in conjunction with the straight disposition of said flanks, is favorable to proper circumferential engagement, bracing fashion, of the assembly, even though the member from which a notch 42 of this kind is cut out is in practice relatively thin.

To implement this arrangement, it is sufficient for the dogs 40 to be cut out after shaping the blank from which they are obtained and for the radial extension of the annular flange 23 concerned to be shaped accordingly.

Moreover, in accordance with the invention the axial bearing of the input part A of the torsional damper device 22 on the transverse wall 13 of the cover 11 is preferably effected in the vicinity of the bend 52 between the transverse wall 13 and the cylindrical wall 12 of the cover 11.

In the embodiment specifically shown in FIGS. 1 through 4, this axial bearing is effected through the intermediary of the louvers 38 on the annular flange 23 concerned, which is that axially nearer the transverse wall 13 and thus that featuring the axial extension 45.

In practice, in the embodiment shown only those of these louvers 38 which border the radially outermost circumferential edges of the corresponding openings 36 contribute in this way to the required axial bearing engagement and, to this end, they feature a transverse rim 53 directed towards the axis X of the assembly through which they are in effective axial bearing engagement with the transverse wall 13 of the cover 11.

As will be readily understood, the torsional damper device 22 may advantageously constitute a previously assembled subassembly which, when the complete assembly is put together, is individually placed as an autonomous unit into the cover 11, by simple axial insertion into the latter, up to the point of axial bearing on its transverse wall 13.

It is then sufficient to insert individually a dog 40 into each of the notches 42 and, following application of sufficient axial force to all the dogs 40 thus employed, to weld these dogs 40 to the cylindrical wall 12 of the cover 11.

This axial force is advantageously such as to procure elastic deformation of the louvers 38 involved in the required axial bearing relationship, implying prestressing of these louvers 38, which provides for making good any deformation of the transverse wall 13 of the cover 11.

Be this as it may, functioning as wedges, the dogs 40 then ensure, as was the intention, the axial and circumferential keying of the torsional damper device 22 to the cover 11.

By virtue of the fact that they constitute separate members, it is not essential for them to be equidistant.

However, if required, the various dogs employed may as an alternative to this all form part of a common ferrule.

For them all to be operative in substantially the same way, it is then obviously desirable for each to be in exact corresponding relationship with the notch with which it must be interlocked.

Figure 6:
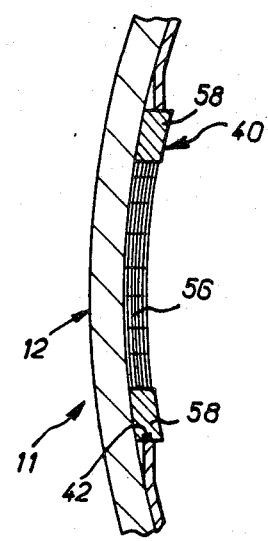

In the alternative embodiment shown in FIGS. 5 and 6 each dog 40 is welded to the cylindrical wall 12 of the cover 11.

To this end a dog 40 of this kind preferably features a recess 55 on its transverse edge opposite the transverse wall 13 of the cover 11 and the corresponding weld bead 56 is formed along the bottom 57 of this recess 55.

This arrangement procures good conditions for retention of the dog 40 in spite of the simple weld employed, the corresponding weld bead 56 affecting an area close to its center of gravity, like the preceding spot welds.

Another result of an arrangement of this kind is the formation of lateral lugs 58 on each dog 40, and the inherent elasticity of these is then advantageously added to that already provided by the lugs 49 of the corresponding notch 42 when, as shown, lugs 49 of this kind are provided.

Figure 7:
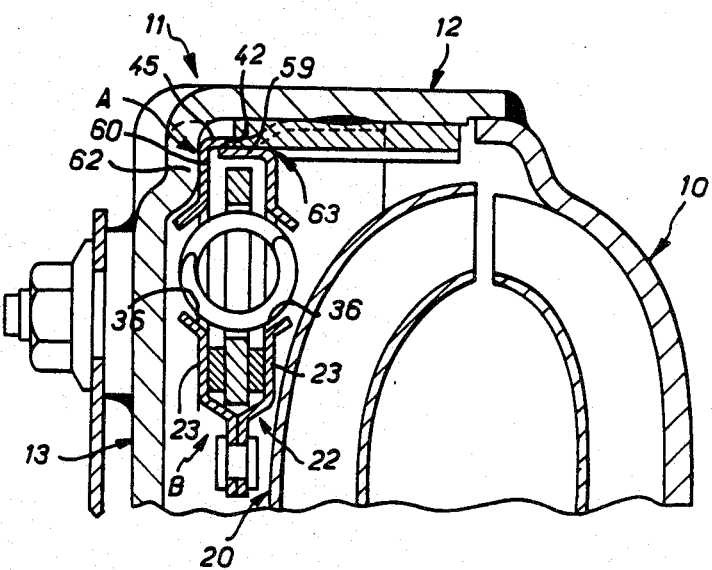
FIG. 7 is a partial view in axial cross-section which, repeating that of FIG. 1 in part, also refers to an alternative embodiment.

In the alternative embodiment shown in FIG. 7, for the purpose of retaining it each dog 40 is, prior to welding, at least partially axially engaged in a rebate 63 formed between the cylindrical wall 12 of the cover 11 and the input part A of the torsional damper device 22.

In practice, that of the annular flanges 23 of this input part A which is axially farther away from the transverse wall 13 of the cover 11 also comprises an axial extension 59 at its outside periphery, beyond the outside periphery of the annular flange 25 of the associated output part B, and said axial extension 59, which extends in the direction towards said transverse wall 13 of the cover 11, forms with the cylindrical wall 12 of the latter the rebate 63 into which is at least partially axially inserted the dog 40 interlocked with the corresponding notch 42.

In the embodiment shown, this axial extension 59, like the preceding one, forms a circumferentially continuous ferrule and the axial extensions 45 and 59 which the annular flanges 23 of the input part A of the torsional damper device 22 thus feature are advantageously in contact with one another in the radial direction.

Moreover, in the embodiment shown, the axial bearing engagement of the input part A of the torsional damper device 22 on the transverse wall of the cover 11 is effected through the portion 60 of the corresponding annular flange 23 of this input part A which is radially beyond the openings 36 which an annular flange 23 of this kind features and, for the purposes of such axial bearing engagement, said transverse wall 13 of the cover 11 comprises, in the immediate vicinity of its bend 52, a localized axially stamped portion 62 directed towards said torsional damper device 22.

An axial stamped portion of this kind may be circumferentially continuous if required.

As shown here, however, it is circumferentially divided into a plurality of locally stamped portions.

It is to be understood that the present invention is not limited to the embodiments described and shown, but encompasses all variants as to its execution and/or combinations of its various component parts.

Furthermore, applications of the invention are not necessarily limited to hydraulic coupling units are specifically described and shown, but extend generally to all transmission systems with integrated movement take-up device, whether or not this movement take-up device constitutes a torsional damper device.

We claim:

1. Transmission system comprising an annular input member adapted to be keyed at least circumferentially to a first shaft and having a generally cylindrical axial wall and a generally transverse radial wall, a movement take-up device within said cylindrical wall having an input part by which it is keyed axially and circumferentially to said input member and adapted to be at least circumferentially keyed to a second shaft, said input part bearing axially on said transverse wall, at least one dog attached to said cylindrical wall and having at least one of its two lateral edges generally transversely disposed relative to the axis of the system and converging towards its other lateral edge in the direction towards said transverse wall, and a notch in part of said input part complementary to said dog and interlocked with said dog.

2. Transmission system according to claim 1, wherein said at least one dog is a plate having a generally trapezoidal contour.

3. Transmission system according to claim 2, wherein said dog has a recess in its transverse edge facing said transverse wall along the back of which it is welded to said cylindrical wall.

4. Transmission system according to claim 2, wherein the edges of said notch with which said at least one dog is interlocked are radially offset from said cylindrical wall of said input member so as to contact the flanks of said dog in the median part thereof.

5. Transmission system according to claim 1, comprising a rebate formed between said cylindrical wall and said input part, in which said at least one dog is at least partially axially engaged.

6. Transmission system according to claim 1, wherein said input part comprises axial lugs elastically deformable in the circumferential direction and at least part of the edges of said notch interlocked with said at least one dog are part of said axial lugs.

7. Transmission system according to claim 1, wherein said input part comprises an axial extension of which said notch interlocked with said at least one dog forms a part.

8. Transmission system according to claim 7, wherein said input part of said movement take-up device comprises at least one transverse annular flange which has an axial extension at its outside periphery and said notch interlocked with said at least one dog is part of said extension.

9. Transmission system according to claim 8, wherein said input part of said movement take-up device comprises two transverse annular flanges of which the one that has said axial extension featuring said notch for said at least one dog is that axially nearer said transverse wall of said input member, said extension being directed in the opposite direction to said transverse wall.

10. Transmission system according to claim 5, wherein said input part of said movement take-up device comprises two transverse annular flanges of which the one that has said axial extension featuring said notch for said at least one dog is that axially nearer said transverse wall of said input member, said extension being directed in the opposite direction to said transverse wall, and wherein the other of said flanges also has an axial extension at its outside periphery which is directed towards said transverse wall of said input member and forms with said cylindrical wall thereof the rebate in which said at least one dog is at least partially engaged axially.

11. Transmission system according to claim 10, wherein said axial extension of said flanges of said input part are in contact with one another radially.

12. Transmission system according to claim 8, wherein said axial extension of the or one flange of said input part forms a circumferentially continuous ferrule.

13. Transmission system according to claim 8, wherein said axial extension of the or one flange of said input part is in contact with said cylindrical wall of said input member.

14. Transmission system according to claim 1, wherein a bend is formed between said transverse and cylindrical walls of said input member and said input part of said movement take-up device bears axially on said input member in the vicinity of said bend.

15. Transmission system according to claim 1, wherein said transverse wall of said input member comprises an axially stamped portion adapted to have said input part of said movement take-up device bear on it.

16. Transmission system according to claim 15, wherein said stamped portion is circumferentially discontinuous.

17. Transmission system according to claim 1, wherein said movement take-up device is a torsional damper device comprising two coaxial parts disposed to rotate relative to one another and elastic means disposed circumferentially between them to oppose such relative rotation, one of said coaxial parts constituting said input part and being keyed to said input member whereas the other of said coaxial parts constitutes an output part and is adapted to be keyed to an output shaft.

18. Transmission system according to claim 17, wherein said input part of said torsional damper device comprises two transverse annular flanges constituting guide rings for said elastic means and comprising openings for accommodating said elastic means, said input part bearing axially on said input member through a portion of one of said flanges which lies radially outside said openings.

19. Transmission system according to claim 17, wherein said input part of said torsional damper device comprises two transverse annular flanges constituting guide rings for said elastic means and comprising openings for accommodating said elastic means, said openings having a projecting louver along at least one circumferential edge and said input part of said torsional damper device bearing axially on said input member through the intermediary of said louvers.

20. Transmission system according to claim 19, wherein said louvers have a transverse lip through which they are adapted to bear axially on said input member.

21. Transmission system according to claim 19, wherein at least some of said louvers are prestressed.

22. Transmission system according to claim 1, comprising a plurality of said dogs which are circumferentially distributed and independent of one another and which each constitute a separate unit.

23. Transmission system according to claim 1, comprising a plurality of said dogs which are circumferentially distributed and which each form part of a common ferrule.

24. Hydraulic coupling member comprising an impeller wheel having an outside wall and a cover having a generally cylindrical wall and a generally transverse wall fastened to said impeller wheel and forming with said outside wall thereof a casing in which are disposed, facing said impeller wheel, a turbine wheel and, within said cylindrical wall and between said transverse wall and said turbine wheel, a movement take-up device, wherein said cover and said movement take-up device constitute a transmission system comprising an annular input member adapted to be keyed at least circumferentially to a first shaft and having a generally cylindrical axial wall and a generally transverse radial wall, a movement take-up device within said cylindrical wall having an input part by which it is keyed axially and circumferentially to said input member and adapted to be at least circumferentially keyed to a second shaft, said input part bearing axially on said transverse wall, at least one dog attached to said cylindrical wall and having at least one of its two lateral edges generally transversely disposed relative to the axis of the system and converging towards its other lateral edge in the direction towards said transverse wall, and a notch in part of said input part complementary to said dog and interlocked with said dog.

25. Movement take-up device having at least one component part comprising at least one notch and adapted to form part of a transmission system comprising an annular input member adapted to be keyed at least circumferentially to a first shaft and having a generally cylindrical axial wall and a generally transverse radial wall, a movement take-up device within said cylindrical wall having an input part by which it is keyed axially and circumferentially to said input member and adapted to be at least circumferentially keyed to a second shaft, said input part bearing axially on said transverse wall, at least one dog attached to said cylindrical wall and having at least one of its two lateral edges generally transversely disposed relative to the axis of the system and converging towards its other lateral edge in the direction towards said transverse wall, and a notch in part of said input part complementary to said dog and interlocked with said dog.

26. Torsional damper device having at least one component part comprising at least one notch and adapted to form part of a transmission system comprising an annular input member adapted to be keyed at least circumferentially to a first shaft and having a generally cylindrical axial wall and a generally transverse radial wall, a movement take-up device within said cylindrical wall having an input part by which it is keyed axially and circumferentially to said input member and adapted to be at least circumferentially keyed to a second shaft, said input part bearing axially on said transverse wall, at least one dog attached to said cylindrical wall and having at least one of its two lateral edges generally transversely disposed relative to the axis of the system and converging towards its other lateral edge in the direction towards said transverse wall, and a notch in part of said input part complementary to said dog and interlocked with said dog.

* * * * *